Nov. 15, 1938.     W. STEINEN     2,136,645
HANDLE FOR DRESSER SET UTENSILS
Filed Dec. 5, 1936
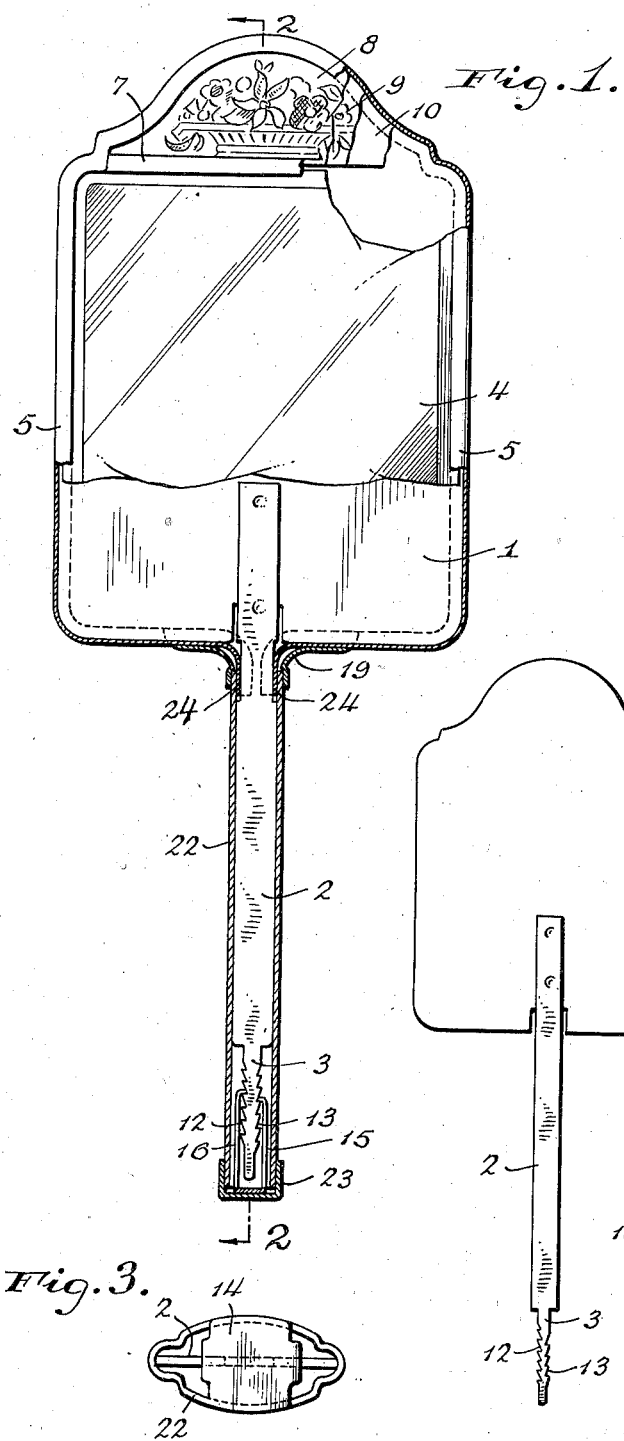
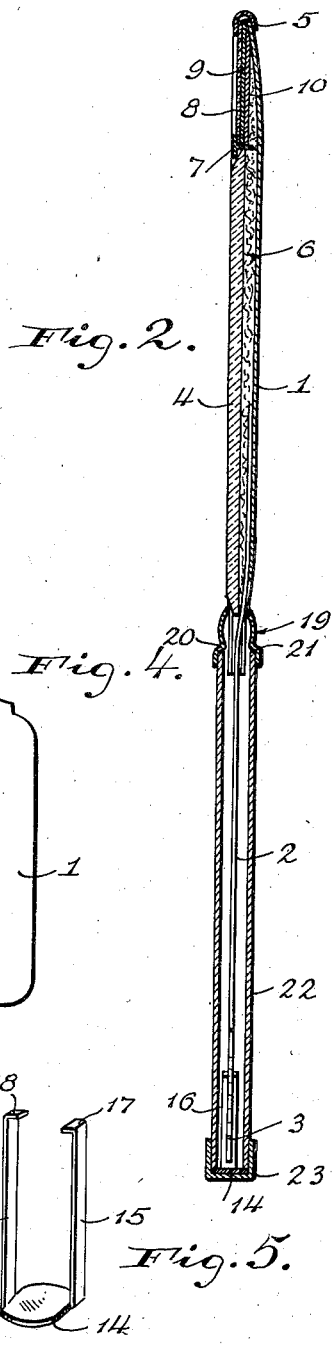
INVENTOR.
WILLIAM STEINEN
BY Richards & Geier
ATTORNEYS Patented Nov. 15, 1938

2,136,645

UNITED STATES PATENT OFFICE 2,136,645

HANDLE FOR DRESSER SET UTENSILS

William Steinen, South Orange, N. J.

Application December 5, 1936, Serial No. 114,303

5 Claims. (Cl. 88—102)

An object of the invention is to construct a hand mirror with as few parts as possible and which is so simple in the arrangement of these parts so as to provide for a quick assembly of the hand mirror.

Another object of the invention is to provide a simple locking means which will enable a locking engagement of the handle on the body of the mirror proper. This locking means is such that it will not mar the lines of the mirror as it is placed interior of the handle member.

Another object of this invention is to provide a mirror with its parts so arranged as to enable a quick assembly of a mirror without the use of bolts or the like for assembling purposes.

A further object of the invention lies in the provision of means for the insertion of an ornamental design or the like in conjunction with the mirror construction.

These and other objects, which will be apparent as the description proceeds, are obtained by the mirror disclosed and illustrated in the following figures.

Figure 1 is a front elevation of a hand mirror with parts cut away to show the exact structure of the handle relative to the main back of the mirror.

Fig. 2 is a sectional view taken through the line 2—2 in Fig. 1.

Fig. 3 is an end view of the handle with end cap removed.

Fig. 4 is a front elevation of the main back plate plus the extension rod.

Fig. 5 is a perspective view of the locking means.

On the figures illustrated, the main back plate of the mirror is shown as 1. The said back plate is made out of sturdy sheet metal and has an extension rod 2 spot welded thereto and extending downwardly from the main back 1. As shown in Fig. 4, the extension rod 2 has a narrow stem portion 3 at its lower end. Said portion 3 has two sets of teeth 12 and 13. These teeth are offset relative to each other, as illustrated in Fig. 4, so as to enable a finer adjustment of the locking means.

As shown in Fig. 1, the back plate 1 supports a rectangular mirror 4. Positioned above the mirror and supported by the back plate is a design 9. Said design 9 is supported by an additional plate 10 conforming to the shape of the design, whereas the front of the design is covered by a transparent material 8, such as Celluloid.

Positioned between the back plate 1 and the mirror 4 is any suitable packing or filler, represented by the character 6. Separating the mirror 4 from the design 9 is a transverse member 7. This member in cross-section is T-shaped, as shown in Fig. 2, so that it may form a suitable partition between the mirror 4 and the design member 9. The ends of the transverse member 7 are inserted beneath the rim 5 so that the transverse member is secured in place. It is apparent that any design, which enhances the appearance of the mirror assembly, might be employed in place of that shown by character 9.

A rim 5 extends about the outer periphery of the back plate 1 and has terminal members 24, which are positioned adjacent the junction of the extension rod 2 with the back plate 1. A throat member, indicated by 19, is positioned over the rod 2 and houses the terminal members 24 and the base of the mirror 4 and back plate 1. A tubular handle 22, which is elliptical in cross-section, as shown in Fig. 3, engages over the rod 2 and the upper portion of said handle is inserted into the throat member 19. Projections 20 and 21 within the throat member 19 act as bearing surfaces for the end of the handle member 22 so as to hold the throat member 19 in its proper position. This feature is more clearly illustrated in Fig. 2.

A locking means is illustrated in Fig. 5 which comprises a base member 14 and two upstanding fingers 15 and 16. The fingers 15 and 16 are of slightly different length so as to engage corresponding offset teeth on the stem 3 of rod 2. The inturned ends 17 and 18 of respective fingers 15 and 16 when properly positioned will engage respective teeth 13 and 12.

With the locking means in assembled position, as shown in Fig. 1, the base 14 of the locking means engages against the bottom of the handle member 22, as shown in Fig. 3, and the upstanding fingers engage teeth on the stem 3 so as to lockingly hold the handle 22 in its assembled position over the rod 2. Any attempt to then remove the handle 2 from the rod will be resisted by the base 14 of the locking member, which is now attached to the rod 2 through the toothed stem 3. To finish the handle to completely enclose the locking means, an end cap 23 is provided over the lower end of the handle 22, as clearly illustrated in Fig. 1.

In the assembly of the device, the mirror 4 is placed against the back plate 1. The design 9, back plate 10 and cover 8 are positioned above the mirror as shown in Fig. 1. The transverse member 7 is positioned between the mirror 4 and the design back plate 10. The rim 5 then circumscribes the back plate and design plate, and holds the various elements in their assembled condition. The terminals 24 of the rim are positioned, as in Fig. 1, at the junction of the rod 2 with the back plate 1. The throat member 19 is then inserted over the rod 2 and is moved to the position of Fig. 1 where it houses the terminal portions 24 with the base of the mirror 4 and back plate 1. The tubular handle 22 is then passed over the rod 2 and is inserted into the member 19. The locking member 14—18 is then passed up through the lower portion of the handle 22, as shown in Fig. 1, to lock the handle 22 on the rod 2. Finally, the end cap 23 is placed over the end of the handle 22 and pressed in position. The finished product is thus one which has no extended parts which form locking means and which destroy the beauty of the handle structure.

Applicant has shown a preferred embodiment of his invention, but it is not his intention to be limited by said preferred embodiment, but rather to cover equivalent structures as covered by the scope of the claims.

I claim as my invention:

1. In a mirror, brush or the like, a front element, a back plate, a channel rim embracing the peripheries of said element and said plate, having parallel end extensions at the base thereof, an extension rod fixed at one end to said back plate, locking teeth provided at the other end of said extension rod, a tubular handle member positioned over said extension rod, a flaring throat element embracing the upper end of the handle member, the base of said rim and said end extensions, and a locking member which engages the bottom of the handle member and the locking teeth to positively hold the handle against displacement on the rod, said rod extending substantially the full length and width of said handle member and said end extensions fitting into the upper end of said handle member.

2. The combination of a back plate for a mirror, brush or the like, an extension rod fixed at one end to said back plate, locking teeth provided at the other end of said extension rod, a rim circumscribing the back plate having terminal portions at the junction of the rod and the back plate, a flaring throat ferrule member engaging and embracing the terminal portions of the rim and the base of the back plate, a tubular handle member, said extension rod extending substantially the full length and width of said handle member, said handle member being inserted into said throat member, and positioned over said extension rod, and a locking member which engages the bottom of the handle member and the locking teeth to positively hold the handle against displacement on the rod.

3. In a mirror, brush or the like, a front element, a back plate, a channel rim embracing the peripheries of said element and said plate, having parallel end extensions at the base thereof, an extension rod fixed at one end to said back plate, locking teeth provided at the other end of said extension rod, a tubular handle member positioned over said extension rod, a flaring throat element embracing the upper end of the handle member, the base of said rim and said end extensions, and a locking member which engages the bottom of the handle member and has upstanding finger elements to lockingly engage the rod teeth so as to positively hold the handle against displacement on the rod, said rod extending substantially the full length and width of said handle member and said end extensions fitting into the upper end of said handle member.

4. In a mirror, brush or the like, a front element, a back plate, a channel rim embracing the peripheries of said element and said plate, having parallel end extensions at the base thereof, an extension rod fixed at one end to said back plate, offset locking teeth provided at the other end of said extension rod, a tubular handle member positioned over said extension rod, a flaring throat element embracing the upper end of the handle member, the base of said rim and said end extensions, and a locking member which engages the bottom of the handle member and has upstanding finger elements to lockingly engage the rod teeth so as to positively hold the handle against displacement on the rod, said rod extending substantially the full length and width of said handle member and said end extensions fitting into the upper end of said handle member.

5. In a mirror, brush or the like, a front element, a back plate, a channel rim embracing the peripheries of said element and said plate, having parallel end extensions at the base thereof, an extension rod fixed at one end to said back plate, offset locking teeth provided at the other end of said extension rod, a handle member positioned over said extension rod, a flaring throat element embracing the upper end of the handle member, the base of said rim and said end extensions, locking means which comprises a bottom plate to engage the bottom of the handle member and upstanding fingers to lockingly engage the rod teeth, and an end cap pressed over the locking means and the bottom of the handle, said rod extending substantially the full length and width of said handle member and said end extensions fitting into the upper end of said handle member.

WILLIAM STEINEN.